(12) United States Patent
Yu

(10) Patent No.: US 7,873,791 B1
(45) Date of Patent: Jan. 18, 2011

(54) METHODS AND SYSTEMS FOR INCORPORATING IMPROVED TAIL CUTTING IN A PREFETCH STREAM IN TBC MODE FOR DATA STORAGE HAVING A CACHE MEMORY

(75) Inventor: Rong Yu, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 479 days.

(21) Appl. No.: 11/906,035

(22) Filed: Sep. 28, 2007

(51) Int. Cl.
*G06F 12/08* (2006.01)
(52) U.S. Cl. ............... 711/137; 711/144; 711/E12.022
(58) Field of Classification Search ................. 711/133, 711/137, 144
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,457,112 B2 * | 9/2002 | Hostetter | 711/170 |
| 6,594,742 B1 * | 7/2003 | Ezra | 711/159 |
| 7,139,878 B2 * | 11/2006 | Malik et al. | 711/137 |
| 7,143,393 B1 | 11/2006 | Ezra et al. | |
| 7,380,065 B2 * | 5/2008 | Davis et al. | 711/134 |
| 2002/0087802 A1 * | 7/2002 | Al-Dajani et al. | 711/137 |
| 2003/0105926 A1 * | 6/2003 | Rodriguez | 711/129 |
| 2003/0126490 A1 * | 7/2003 | Litt et al. | 713/502 |
| 2003/0221069 A1 * | 11/2003 | Azevedo et al. | 711/136 |
| 2004/0064651 A1 * | 4/2004 | Conway | 711/141 |
| 2005/0010723 A1 * | 1/2005 | Cho et al. | 711/118 |
| 2006/0090036 A1 * | 4/2006 | Zohar et al. | 711/133 |
| 2006/0143384 A1 * | 6/2006 | Hughes et al. | 711/130 |
| 2006/0143392 A1 * | 6/2006 | Petev et al. | 711/133 |
| 2008/0183903 A1 * | 7/2008 | VanStee et al. | 710/5 |
| 2008/0209120 A1 * | 8/2008 | Almog et al. | 711/106 |
| 2008/0320228 A1 * | 12/2008 | Brunheroto et al. | 711/137 |

OTHER PUBLICATIONS

U.S. Appl. No. 11/726,744, filed May 22, 2007, Orit Levin-Michael et al.

* cited by examiner

*Primary Examiner*—Matt Kim
*Assistant Examiner*—Hal Schnee
(74) *Attorney, Agent, or Firm*—Muirhead and Saturnelli, LLC

(57) ABSTRACT

A cache management system and method monitors and controls the contents of cache memory coupled to at least one host and at least one data storage device where data-units are prefetched and stored into a cache memory in a data-set format, comprising the data-units and meta-data associated with the data units. The meta-data contain time stamp information encoded with information whether the cached prefetched information is available for reuse by additional prefetched data. Prefetched data-units are controlled by executing a first prefetch task to prefetch a first prefetch series of data-units from off-cache. A first prefetch operation is executed to prefetch and store a first selected set of data units. The prefetch task contains three dedicated pointers into cache memory. Decisions to prefetch data are made about the first prefetch task, subsequent prefetch operations and prefetch tasks based on these pointers, in-cache data-sets associated with the first prefetch task and on other data-sets that are read from off-cache but that are not associated with the first prefetch task. The cache management system and method reviews data-sets and controls the allocation and deallocation of space in the cache memory.

20 Claims, 10 Drawing Sheets

METHODS AND SYSTEMS FOR INCORPORATING IMPROVED TAIL CUTTING IN A PREFETCH STREAM IN TBC MODE FOR DATA STORAGE HAVING A CACHE MEMORY

BACKGROUND OF THE INVENTION

1. Field of the Invention

This present invention generally relates to a computer system and more particularly to cache management in a computer system.

2. Description of the Prior Art

Data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Performance of a storage system may be improved by using a cache. Cache memory may be used to store frequently accessed data for rapid access. Typically, it is time-consuming to read or compute data stored in the disk data storage devices. However, once data is stored in the cache memory, future use can be made by accessing the cached copy rather than reading it from the disk data storage device, so that average access time to data may be made lower.

One technique for expediting read requests involves prefetching data-units so that more data-units are available from cache memory rather than from disk storage. Typically, prefetching is implemented by reading data-units in blocks in response to one or more requests to read a data-unit. Since a request to read a specific data-unit increases the likelihood that access to other, related data-units will soon be required, the read request for the data-unit may trigger a prefetch request to read related data-units as well, particularly when a read request results in reading a data-unit off-cache rather than from the cache memory.

When, in the course of executing a read request, the requested data-unit is found in-cache, the operation constitutes a "Hit." If the requested data-unit is not found in-cache, the operation constitutes a "Miss."

Prefetching requires a significant number of cache-slots to be available in the cache memory. When long sequences of data-units are prefetched into the cache memory, other data-units typically have to be removed in the cache memory in order to make room for the newly prefetched data-units.

Prefetching also raises the possibility that data-units for which the host processor requires access may be replaced by data-units for which the host processor does not and never will require access. It is therefore, important to remove cache data that is not likely to be still required by the data storage system. Cache Pollution is defined to be the population of the cache memory with data-units that are not required for re-accessing.

Sequential prefetching, which involves reading blocks of adjacent data-units, assumes that data-units that are adjacent to a requested data-unit are also likely to be accessed. In fact, access requests often involve data-units that are sequential. Recognizing that the physical devices, such as disks, upon which data is stored off-cache, are organized and segmented into one or more logical volumes (LVs), the addresses of the adjacent data-units may not be physically sequential on the disk, but they will be sequential on the logical volume to which the data on the disk is mapped.

A feature known as "tail cutting" or simply "cutting" may be used to reduce cache pollution. Typically "tail cutting" uses two pointers to track the "oldest" and "newest" data. In tail cutting, a maximum number of data-units may be stored in the cache memory pursuant to a prefetch task. Once the maximum number has been prefetched into cache memory, certain data-units will be removed from the cache memory to make room for data-units prefetched pursuant to the prefetch task or pursuant to another prefetch task. Techniques used in connection with cache management including the use of "Tagged Based Cache" (TBC) and the use of timestamps are disclosed in U.S. Pat. No. 7,143,393 entitled Method For Cache Management For Positioning Cache Slot, Ezra, et al., which is hereby incorporated by reference. A data management system managing of data in a computer system by a data storage system is disclosed in U.S. patent application Ser. No. 11/726,744 entitled Methods And Systems For Incorporating Sequential Stream Read Requests Into Prefetch Management for Data Storage Having A Cache Memory, Orit Levin-Michael, et al, which is also hereby incorporated by reference.

Cache memory methods that allocate cache memory locations in blocks associated with a prefetch task have administrative overhead associated with releasing less the then the original allocated block size. Detailed knowledge of each prefetch task is also required for the efficient deallocate old data. This makes the architecture of a background task to release old prefetched data difficult. It would be advantageous to provide a prefetch implementation utilizing tail cutting in which the data storage system prefetches, tracks and stores data-units in the cache memory in such a way as to easily identify and release old prefetched memory locations.

SUMMARY OF THE INVENTION

Advantages of the invention will be set forth in part in the description which follows, and in part will be obvious from the description, or may be learned by practice of the invention. The advantages of the invention will be realized and attained by means of the elements and combinations particularly pointed out in the appended claims and equivalents thereof.

In one embodiment the invention comprises a method for prefetching data-units into a cache memory in response to data read requests from at least one host processor. The cache memory is connected to the at least one host processor and to at least one off-cache data storage device. The prefetch method executes a first prefetch task to prefetch a first prefetch series of data-units from the off-cache data storage device's logical locations for storage in the cache memory. Note that the term "first prefetch operation as used herein is not meant to be limited to the very first prefetch operation issued pursuant to a prefetch task. The term "first prefetch operation as use herein is merely meant to uniquely identify a specific prefetch operation, in which a specific set of data-units is perfected and stored in the cache memory in accordance with a specific prefetch task.

The prefetch task initiates a first prefetch operation to prefetch a first selected set of data-units. The prefetch task then stores the data-units in a data-set in the cache memory. The data-set comprises the data-units are prefetched in accordance with the first prefetch task and meta-data is associated with the data-units. The meta-data comprises, in part, a timestamp field. The timestamp information and information indicate whether or not the data-unit in the data-set contains valid data. The information indicating whether or not the data-unit contains valid data is encoded in the timestamp information.

The prefetch task makes decisions about the first prefetch task, subsequent prefetch operations and prefetch tasks based on read requests, the data-units requested by the read requests, and the data-units that are stored in the cache memory and that are associated with the first prefetch task.

The prefetch task determines whether or not an additional data-unit, read from an off-cache logical location, is a first prefetch series member comprising a data-unit in the first prefetch series. If the task determines that the additional data-unit is a first prefetch series member, the task associates the additional data-unit with the first prefetch task.

The prefetch task treats the additional data-unit prefetched into cache memory in accordance with the first prefetch task if the additional data-unit is associated with the first prefetch task.

In another aspect of the prefetch method embodiment the prefetch task tracks the available unused data-unit space in the cache memory and allocates unused data-unit space in the cache memory. The prefetch task also stores the prefetched data-units at an allocated cache memory space.

In another aspect of the prefetch embodiment method the meta-data further comprises the address of cache memory space allocated for the data-unit storage.

In another aspect of the prefetch method embodiment reviews the meta-data for a data-unit to be deallocated. The prefetch method selects the data-unit for deallocation if it conforms to selected criteria. The method deallocates the data-unit space in the cache memory and store information in the meta-data associated with the read data-unit indicating that data-set does not contain valid data.

In another aspect of the prefetch embodiment method, the deallocation of data-unit space in the cache memory further comprises adding the address of the deallocated data-unit space to a free cache pool list.

In another aspect of the prefetch embodiment method the deallocation selection criteria comprises meta-data indicating a previously read data-unit.

In another aspect of the prefetch embodiment method the deallocation selection criteria comprises meta-data of a selected timestamp value.

In another aspect of the prefetch embodiment method the prefetch task tracks the address of the logical location at which the host processor is currently reading, the address of the logical location of the prefetched data-unit address of the prefetch task and also tracks the address of the logical location of the oldest data-set associated with the prefetch task. Tracking the address of the logical location of the oldest data-set associated with the prefetch task is the improvement not performed in older methods.

In another aspect of the prefetch method embodiment the method comprises removing data-set's association as a prefetch series member upon the determination of a data-unit being deallocated.

In another aspect of the prefetch method embodiment removes the logical location associated with the data-set, removed as a prefetch series member, from the tracking address of the oldest data-set associated with the prefetch task, and then updates the prefetch task tracking address of the logical location of the oldest data-set currently associated with the prefetch task.

In accordance with the invention, as embodied and broadly described herein, in one embodiment, the invention also comprises a method for cache management for reducing cache pollution. The cache memory is connected to at least one host and to at least one off-cache data storage device. The cache management method reviews a data-set in the cache memory. The data-set comprises a data-unit conforming to data stored in an off-cache data storage device's logical location and meta-data associated with the data-units. The cache management method decides if the data-unit's cache memory space conforms to a deallocation criteria. If so it deallocates the data-unit cache memory space.

In another aspect of the cache management method embodiment, the deallocation criteria comprises determining if timestamp value conforms to a selected timestamp value.

In another aspect of the cache management method embodiment, the deallocation criteria comprises reviewing the data read information in the meta-data to determine if the data-set has been read by a host processor.

In another aspect of the cache management method embodiment encodes the timestamp value in the meta-data to indicate that the data-unit is to be deallocated.

In another aspect of the cache management method embodiment maintains a free cache pool list and adds the location of the deallocated the data-unit cache memory space to the free cache pool list.

In another embodiment of the invention, a data storage system is adapted to monitor and respond to host processor data read requests for data stored at a logical location in the data storage system. This data storage system comprises cache memory, off-cache memory and, a data storage controller connected to the cache memory and the off-cache memory. The data storage controller runs a prefetch management system to prefetch data from the off-cache memory, and to monitor data read requests from a host processor and to transfer data to the cache memory. The prefetch management system has a prefetch task executor for initiating a first prefetch task. This first prefetch task prefetches a first series of data-units from off-cache memory logical locations in the off-cache memory storage in the cache memory.

The prefetch task executor has a prefetch operation initiator to initiate a first prefetch operation to prefetch the first prefetch series of data-units, and a cache storing unit which stores data-units in a data-set in the cache memory in accordance with the first prefetch task. The data-set contains the data-units which have been prefetched from the off-cache data storage and meta-data associated with the data-units. The cache storing unit stores the timestamp information and information on whether the data-set contains valid information and encodes the valid data-set information into the timestamp information. This encoded timestamp information is stored in the associated meta-data portion of the data-set.

The prefetch management system also has a prefetch decision unit that makes decisions about the first prefetch task, the first prefetch operation and subsequent prefetch operations, and subsequent prefetch tasks based on read requests, the data requested by the host processor data read requests, and also the data-units that are stored in the cache memory and that are associated with the first prefetch task.

The prefetch management system further includes a prefetch set member identifier which determines whether an additional data-unit read from the off-cache memory logical location is a first prefetch series member that comprises a data-unit in the first prefetch series of data-units.

The prefetch management system further includes a prefetch task association unit adapted to associate the additional data-unit as a first prefetch series member.

Upon finding an association between the additional data-unit and the first prefetch task, the prefetch decision unit makes a decision to treat the additional data-unit as having been prefetched into cache memory in accordance with the first prefetch task.

The cache memory responds to the host processor data read request by retrieving the requested data from the off-cache logical location, if the requested data is not available in the cache memory. The cache memory also responds to data write requests by the prefetch management system.

The off-cache memory responds to the host processor data read request by retrieving the requested data from off-cache memory logical locations if the data is not available in the cache memory. The off-cache memory also responds to the data read requests by the prefetch management system.

In another aspect of the data storage system, the prefetch task executor tracks the address of the logical location at which the host processor is currently reading, tracks the address of the logical location at which the prefetch task is prefetching data-units and also tracks the address of the logical location of the oldest data-set associated with the prefetch task.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE PREFERRED EMBODIMENT(S)

Figure 1:
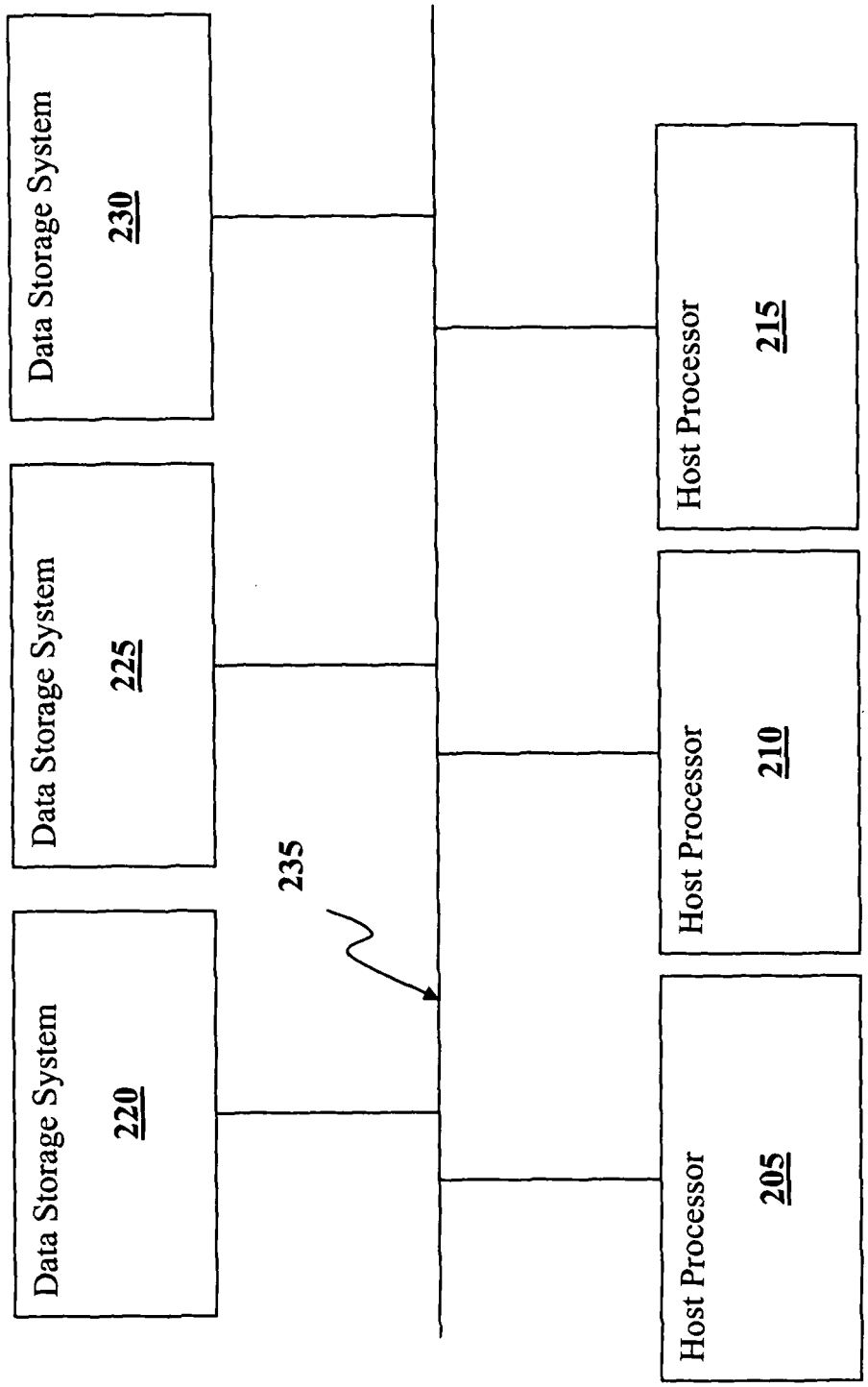
FIG. 1 is a block diagram of a functional architecture for a computer system, according to an embodiment of the invention.

FIG. 1 is a block diagram of a functional architecture for a computer system including a data storage system, according to an embodiment of the invention.

As shown in FIG. 1, host processors, or hosts, or host systems 205, 210, and 215, are coupled to each of data storage systems 220, 225, and 230, via communications link 235. Link 235 may include the Internet, an intranet, a wired link, a wireless link, or other link, and may utilize Transmission Control Protocol/Internet Protocol (TCP/IP), Small Computer System Interface (SCSI), Fibre Channel, or other communications protocol. Link 235 may also represent a plurality of links of the same or different types; all or a portion of these links may be redundant. Any host can access data in any one or more data storage systems, and data may be transferred between data storage systems.

Variations to the architecture illustrated in FIG. 1 are possible. For example, the number of hosts need not equal the number of data storage systems. And there is no theoretical limit to the number of either type of functional component.

Figure 2:
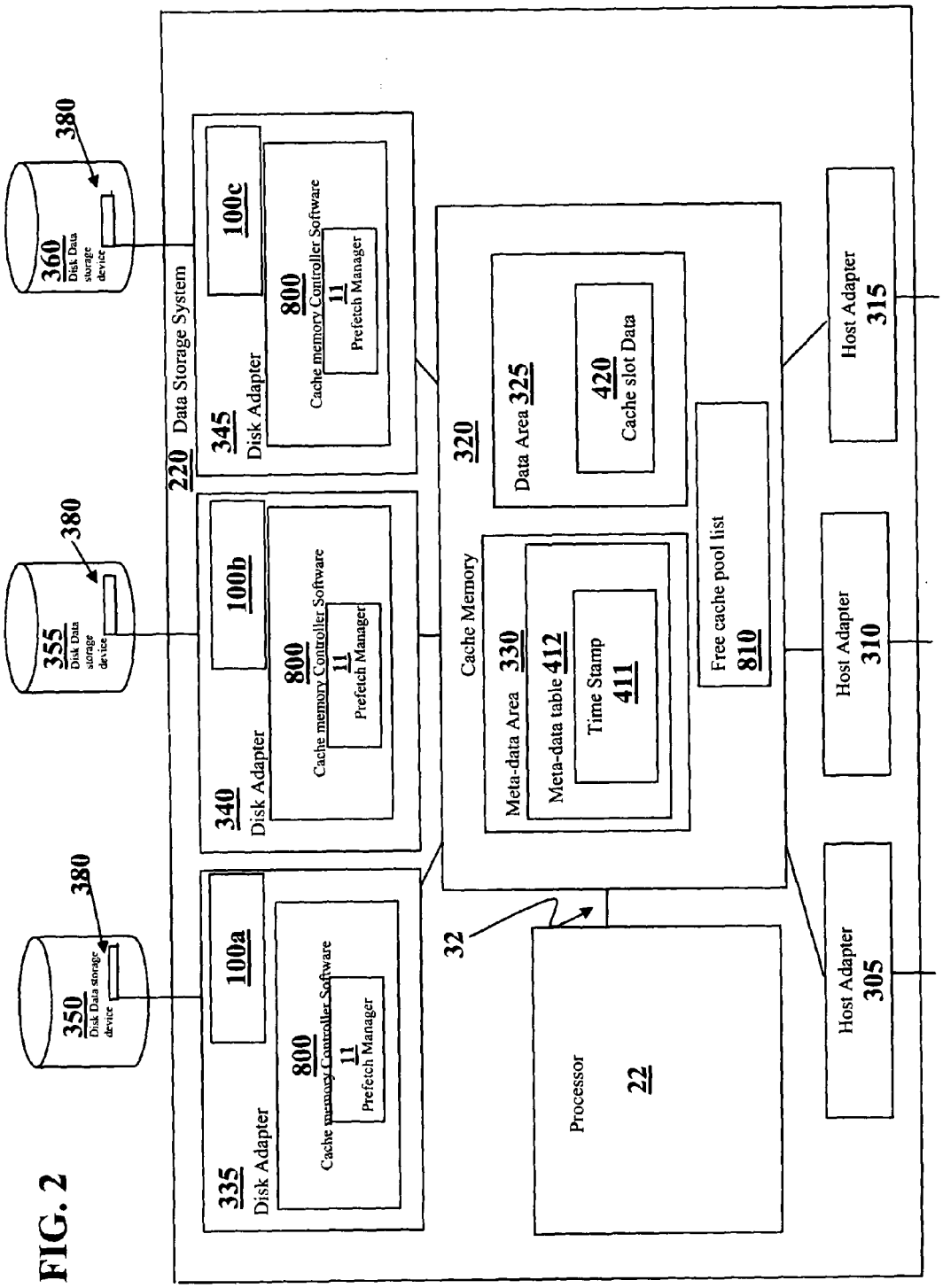
FIG. 2 is a block diagram of a functional architecture of a data storage system in a computer system, according to an embodiment of the invention.

FIG. 2 is a block diagram of a functional architecture of a data storage system 220, according to an embodiment of the invention. The block diagram illustrated in FIG. 2 represents an exemplary embodiment of any one or more of the data storage systems 220, 225, and 230 shown in FIG. 1. As illustrated in FIG. 2, the system 220 may include one or more host adapters 305, 310, and 315, which are coupled to a cache memory 320. One or more of the host adapters 305, 310, and 315 may be or include, for example, a Fibre Channel adapter. In operation, the host adapters 305, 310, and 315 provide a communication interface for any one or more of host systems 205, 210, 215, and may be used to manage communications and data operations between one or more host systems and the cache memory.

Each of the disk adapters 335, 340, and 345 are coupled to and between the cache memory 320 and a corresponding disk data storage device 350, 355, and 360. The disk adapters 335, 340, and 345 are responsible for the backend management of operations to and from a portion of the disk data storage devices 350, 355, 360.

The disk adapters 335, 340, and 345 contain lists 100*a*, 100*b*, and 100*c* for holding information relevant to the each of the different prefetch tasks with which the data-units stored on the disk data storage devices 350, 355, 360 are involved. In other embodiments, the lists 100*a*-100*c* may reside on other components of a data storage system 220, 225, 230, or, specifically for the system 220, on the host adapters 305, 310, and 315 or the cache memory 320. The lists 100 *a*-*c* contain information that includes but is not limited to location information and statistical information about the specific prefetch tasks. Each of the disk data storage devices 350, 355, 360 includes one or more physical devices, such as disks, and is organized and segmented into one or more logical volumes (LVs) 380, which are logical representations of physical volumes.

Variations to the architecture illustrated in FIG. 2 are possible. For example, each one or more of the disk adapters 335, 340, and 345 may manage read and write operations associated with more than a single disk, and a single disk may be managed by more than one disk adapter. Moreover, a logical volume 380 may span multiple disks associated with a disk adapter, or any part of one or more disks associated with a disk adapter may be considered a logical volume 380, although the term logical volume 380 is not intended to be limited by these examples.

Cache management functions are provided throughout data storage system 220. Thus, data storage system 220 shown in block diagram form in FIG. 2 includes prefetch manager 11 to provide prefetch management functions. In the preferred embodiment shown in FIG. 2, prefetch manager 11 is resident on the disk adapters 335, 340, and 345. Alternatively, the prefetch manager 11 can be resident in any one location such as cache memory 320, disk adapters 335, 340, and 345, and host adapters 305, 310, and 315, or distributed over one or more of such locations.

In order to improve data processing system performance, a data processing system with the present data storage system does not wait for disk adapters 335, 340, and 345 to read or write data directly to or from the appropriate disk data storage device(s) but rather, data to be written to or read from the disk data storage device(s) is stored in cache memory 320. The present invention is primarily directed to disk data storage device read requests by a host system, although managing write requests will also benefit by the use of the present invention. In the preferred embodiment, cache memory 320 includes high speed semiconductor memory whose data is rapidly accessible to both the disk adapters 335, 340, and 345 and the host adapters 305, 310, and 315.

As also illustrated in FIG. 2, the cache memory 320 may include a data area 325, a meta-data area 330 and a free cache pool list 810. The meta-data area 330 stores meta-data, or information, including a cache contents index/directory, about data-units stored in disk data storage devices 350, 355, and 360. Table 412 is used for relatively temporary in-cache storage of meta-data associated with data-units stored in cache slot data area 420. The headers for each of the cache-slots contains time stamps 411 for keeping track of when a given data-unit was last stored in cache memory or when it was last used by a host processor.

The data area 325 contains temporary storage of currently fetched or prefetched in-cache storage of data-units and provides relatively quick access these data-units as compared to the operation of disk data storage devices 350, 355, and 360. Each data area 325 contains cache-slot data-unit storage 420. Each cache-slot data-unit storage 420 is associated with either cache meta-data 412 or the free cache pool list 810.

The free cache pool list 810 contains a list of pointers to the address of all the currently unallocated cache-slots data locations.

Each of the disk adapters 335, 340, and 345 control data read and write operations associated with corresponding disk data storage devices 350, 355, and 360. Each of the disk adapters 335, 340, and 345 may also enable communications between a corresponding disk data storage device and the cache memory 320. The cache memory 320 may facilitate data transfer between any one of the host adapters 305, 310, and 315, and any one of the disk adapters 335, 340, and 345. In addition, to the extent that data residing in disk data storage devices 350, 355, and 360 may be transferred between disks, the cache memory 320 may facilitate such disk-to-disk data transfer.

The disk adapters 335, 340, and 345 perform data operations to and from the cache memory 320, for example, in communications with other adapters, processors or directors, and other components of the data storage system. Generally, the cache memory 320 may be used in facilitating communications between components in the data storage system.

An embodiment of a data storage system 220 may include a data storage controller or processor 22 used to manage and monitor the data storage system 220. The processor 22 may be any one of a variety of commercially available processors, such as an INTEL-based processor, or the like.

In the embodiment of the present invention illustrated in FIG. 2, the processor 22 may be connected to the cache memory 320 through the connection 32. A computer program product in the form of cache memory control software 800 may be used to implement the prefetch manager 11. In the embodiment of the present invention illustrated in FIG. 2, the cache memory control software 800 is loaded into and out of the data storage system 220 via a computer readable medium in processor 22. In operation, it is preferred that the components of the cache memory control software 800 that implement the prefetch manager 11 reside on a computer readable medium in each of the disk adapters 335, 340, 345. Further, it will be understood by those skilled in the art that the computer program product defining the operations and methods herein described are deliverable in many forms, including but not limited to (1) being permanently stored on non-volatile Read only Memory (ROM) or (2) being alterably stored on writable storage media such as compact disks (CDs), random access memory (RAM) devices, floppy disks, and other magnetic and optical media, or (3) being conveyed to a computer through communication media, for example using baseband signaling or broadband signaling techniques, as in an electronic network such as the Internet or telephone modem lines. The operations and methods may be implemented in a software executable out of a memory by a computer such as processor 22 or disk adapters 335, 340, 345 and host adapters 305, 310, 315, or as a set of instructions embedded in a carrier wave. Alternatively the operations and methods may be embodied in whole or in part using hardware components such as Application Specific Integrated Circuits (ASICs), state machines, controllers or other hardware components or devices, or a combination of hardware and software components.

In addition, similar software components may exist in each of the other processors associated with data storage systems such as 225, 230. In other embodiments, this software 800 may also reside on any of the host systems 205, 210, 215 or on computer readable medium accessible by host systems 205, 210, 215 or processor 22.

As used herein, the meta-data table 412 refers broadly to a collection of meta-data for ready reference. In an embodiment of the invention, there may be a portion of a meta-data table associated with each portion of a logical volume 380. Virtually every operation conducted by the data storage system 220 may access the meta-data table 412. It may be accessed, for example, when a track needs to be locked or unlocked, when it is necessary to identify whether or not a track is in cache, or whether a mirror is valid, or while application bits need to be set. Variations to the meta-data table 412 illustrated in FIG. 2 are possible. For example, there may be another meta-data table or other method to store the data-unit information.

Figure 5:
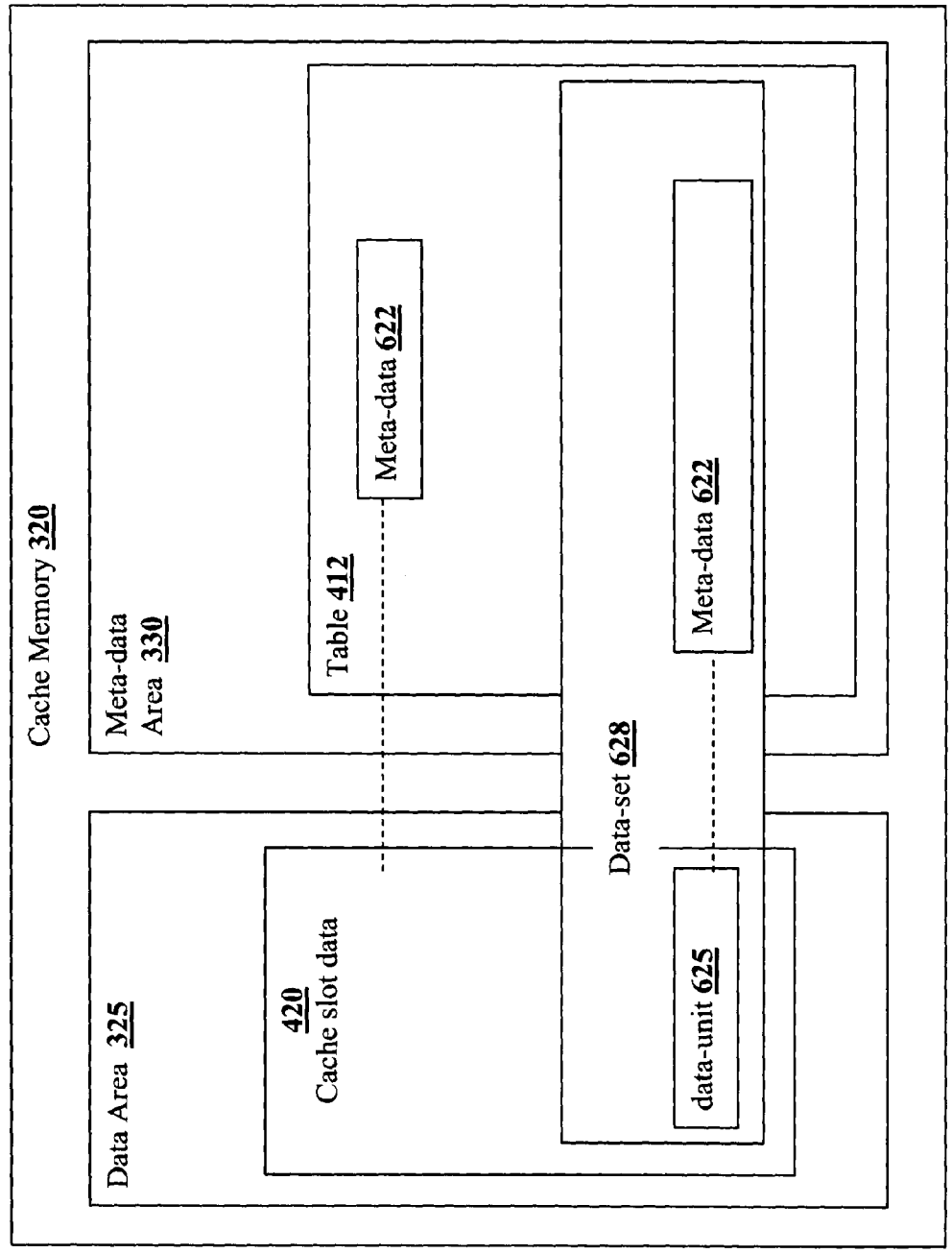
FIG. 5 is a block diagram showing the organization of data in the cache memory 320 in FIG. 2.

FIG. 5 shows a block diagram showing the organization of data in the cache memory 320 in FIG. 2, according to one embodiment of the present invention. As noted above the cache memory 320 is organized into a data area 325 for storing data-units, shown as 625, and a meta-data area 330 for storing meta-data. The meta-data shown as 622 is associated with the data-unit 625. A Data-set 628 comprises the data-unit 625 and the meta-data 622 associated with the data-unit 625. The cache-slot in which the data-unit is stored has a back-pointer to the table entry 414 (which will be further described in connection with FIG. 3) with which is it associated and possibly a copy of the associated meta-data.

It should be noted that the data-units are only temporarily stored in the cache memory 320. As noted above, each of the disk data storage devices 350, 355, 360 contains physical devices, such as disks, that may be organized and segmented into one or more logical volumes (LVs) 380, which are logical representations of physical storage space. Data-units may be considered to be stored on disk data storage devices 350, 355, 360, or the logical volumes 380. A Data-set 628 comprises the data-unit 625 and the meta-data (table entry 414) associated with the data-unit 625, no matter where the data-unit 625 is stored.

Figure 3:
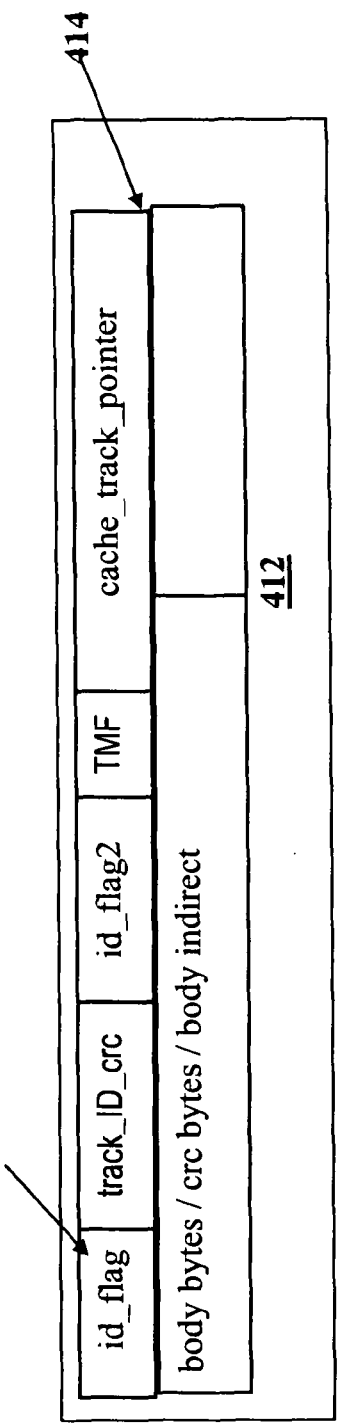
FIG. 3 is a block diagram of a table entry in a table in the meta-data area 330 shown in FIG. 2.
Figure 4:
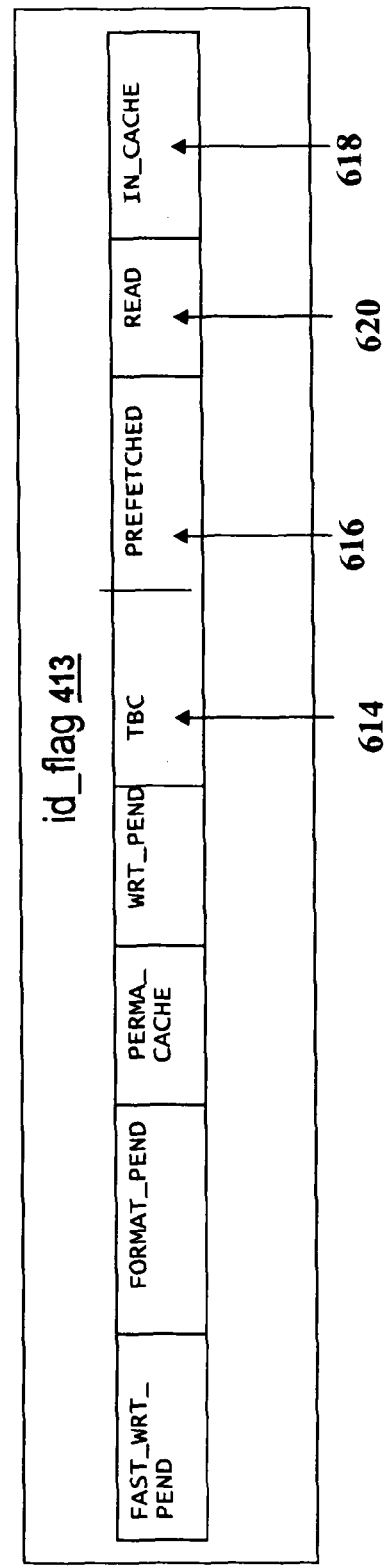
FIG. 4 is a block diagram of further detail of the table entry shown in FIG. 3.

Turning now to FIG. 3, meta-data table 412 may have multiple table entries 414, also known as track IDs or TIDs, each comprising multiple fields to assist in keeping track of the use of the data-unit. FIG. 3 shows an illustration of a meta-data table entry 414 for storing the meta-data, according to an embodiment of the invention. As shown in FIG. 3, table entry 414 indicates application designations for each field of the meta-data area 330. In the illustrated embodiment, the table entry 414 also has an id_flag field 413. As shown in FIG. 4, the id_flag field 413 is organized into multiple fields that could comprise sub-fields for storing meta-data describing the status of and other details about tracks. In the illustrated embodiment, the id_flag field 413 has a PREFETCHED field 616, for storing meta-data identifying whether the track has been prefetched into the cache 325; and an in cache flag 618, for storing meta-data indicating that a copy of the data-unit may be found in a cache slot 514 in the data area 325 of cache memory 320.

As noted above, prefetching a data-unit does not necessarily mean that the data-unit will be used. Tail cutting may be used to limit the number of data-units that are associated with a prefetch task and that are stored in cache memory. Sequential prefetching with tail cutting may be implemented in the data storage system shown in FIG. 2.

The preferred implementation uses a modified version of the Tagged Based Cache (TBC) method disclosed in U.S. Pat. No. 7,143,393 entitled Method For Cache Management For Positioning Cache Slot, Ezra, et al, for tracking cache pollution; however other methods may be used.

Continuing with FIG. 2, the input criteria used by a prefetch manager 11 component of the cache memory controller software 800 in implementing sequential prefetching with tail cutting includes three elements, namely: (a) the minimum number of data-units which must be retrieved and stored in cache memory and used by the system before the cache management system recognizes a sequential data access in progress; (b) the number of data-units to bring into the cache memory during each prefetch operation and maximum number of data-units which the cache management system is to prefetch ahead; and (c) the maximum number of sequential data-units to be stored in cache before the cache-slots containing the previously used data-units are reused or recycled to make room for new data-units written to these location(s). The three criteria required by the cache management system are maintained by the prefetch manager 11 on each disk adapter 335, 340, 345 for each device coupled to the controller.

The Cache memory Controller software 800, controls the prefetch manger 11. When data is prefetched from a disk, the data is stored in Cache memory. The cache memory contains a meta-data area 330, as well as a data area 325 for the data that is read from off cache disk data storage 350.

The cache meta-data area 330 would contain a meta-data table 412 associated with each logical volume (LVs) 380. The id_flag 413 of the meta-data table 412 has an in_cache flag 618 also includes a TBC field. This TBC field contains a timestamp that changes in value the longer the data remains in cache memory. Information indicating whether or not the data-unit in the data-set contains valid data, is encoded with the timestamp information and stored in the TBC field. In our preferred implementation a zero value encoded in the TBC field indicates that cache memory 320, that is associated with Data-set 625, no longer contains valid data. The cache-slot data memory location 625, pointed to by the cache_track_ pointer 414 that is associated with meta-data location 622, contains the location in data area of cache data memory that is available to be deallocated. Once the cache-slot data location 625 in the cache-slot data area has been released, the cache-slot data area 625 is added into the free cache pool list 810.

Figure 6:
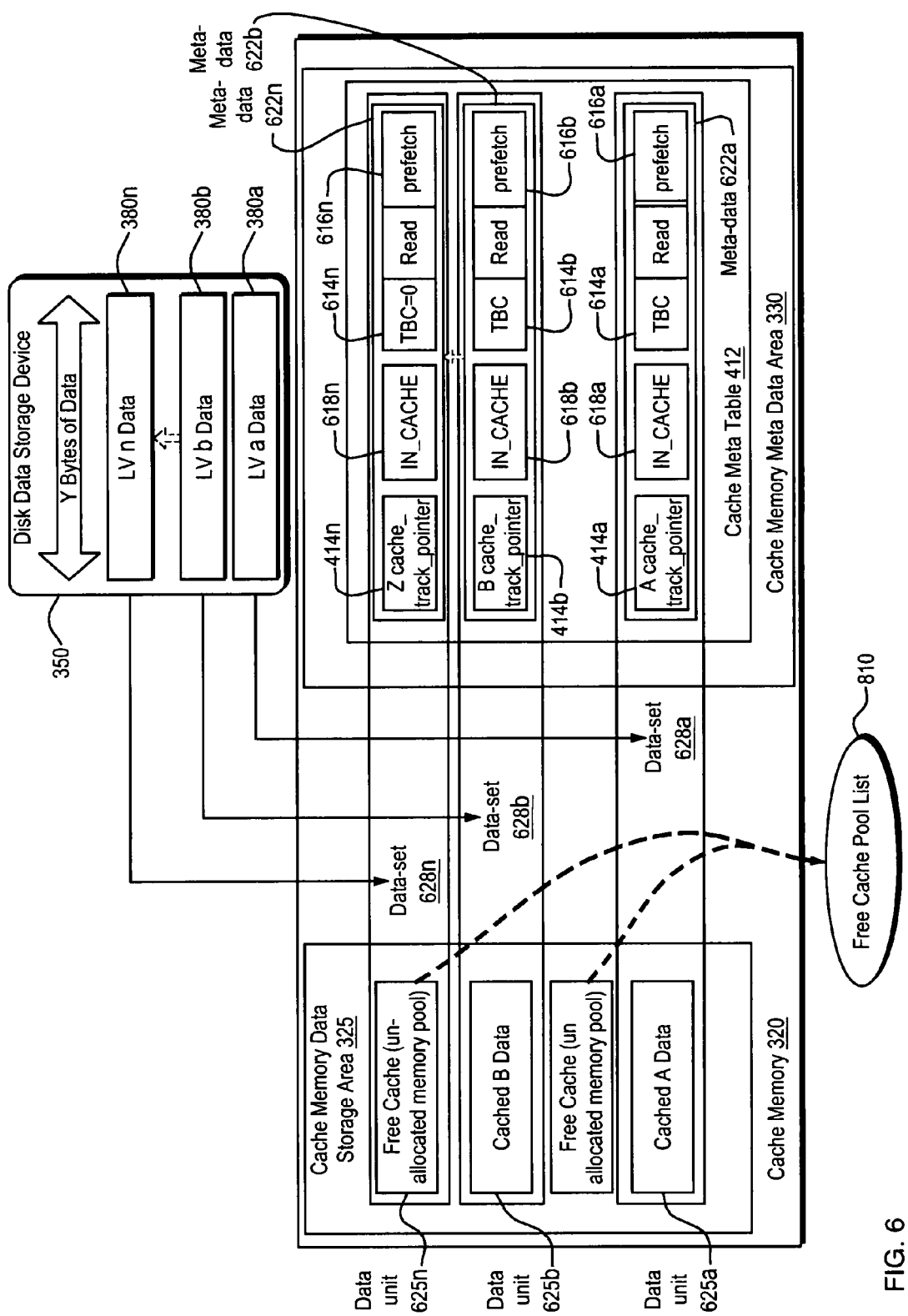
FIG. 6 is a block diagram showing the relationship between logical volume and cache Data-sets.

FIG. 6 of the present invention shows a block diagram of the cache management system of the present invention indicating the relationship between the organization of data in the cache memory 320, the free cache pool list 810 and the logical volumes 380. FIG. 6 shows a disk data storage device 350 containing multiple logical volumes (LV) 380a-380n. The cache-slots in meta-data table 412 contain one meta-data entry 622a-622n for each logical volume. Valid Data-sets 628a and 628b comprises the data-units 625a, 625b and the meta-data 622a, 622b (table entry 414) associated respectively with the data-units 625a and 635b. Data-set 628n shows a Data-set with a TBC field 614n set to zero, which indicates that logical volume 380n is not currently stored in the cache memory 320 and that that the in_caches_track_ pointer 414n is invalid. Once the TBC field for meta-data 622n is set to zero, the data-unit 625n location is freed and added to the free cache pool list.

Each time a host processor 205, 210, 215 as shown in FIG. 1 requests data of a Data Storage System 220 that is not in cache memory 320 as shown in FIG. 3, a read miss occurs. The data storage processor 22 controlled by the cache memory controller software 800 then reads the requested data from the off-cache disk data storage device 350. The data storage processor 22 maintains a free cache pool list 810 of free or unused cache-slot data locations 420 in the cache data area 325. The storage processor selects a free cache-slot data location 420 from the free cache pool list 810, removes the selected cache-slot data location from the free cache pool list 810 and assigns that cache slot location to the requested data. Once the data storage processor transfers the requested data to its assigned cache-slot data location 420. The TBC field for the id_flag 413 of the meta-data table 412 is set to a predetermine value, the in_cache flag 618 is also set, and the cache_track_pointer 412 assigned by the cache pool allocation process.

Figure 7:
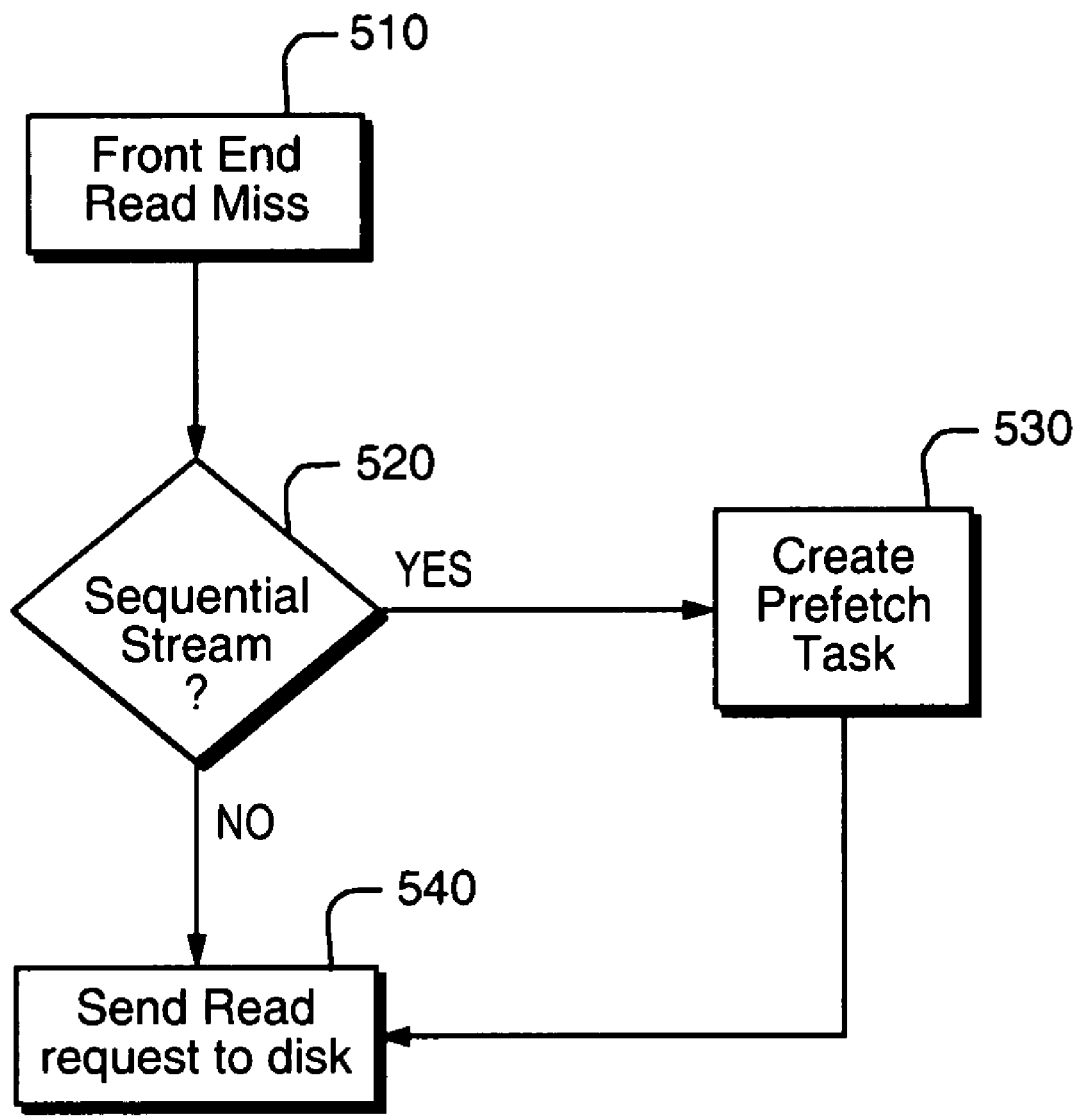
FIG. 7 is a flow chart of the sequence stream detector process.

FIG. 7 describes the sequence stream detector process executed by data storage processor 22 controlled by the cache memory controller software 800. This sequence stream detector process reviews the cache meta-data to see if there is a sequence of data being requested by the host. If host process requests data from the data storage system 220, and the storage processor 22 determines that the requested data is not already stored in the cache memory 320, then a Read Miss is generated as shown in step 510. The process proceeds to step 520 where the storage processor 22 executes a sequential stream process to determine if the requested data is related to previously requested data. If so, then the storage processor creates a prefetch task in step 530. In step 540, the prefetch task issues a data read request to the off-cache disk data storage device 350 for both the storage processor 22 requested data and additional sequential data requested by the prefetch task in step 530.

If a prefetch task has been started, it prefetches a preset amount of logical volumes. For example, a prefetch task is set to prefetch the next 5 logical volumes LV a-LV e from the disk data storage device 350. For each of the prefetched logical volume, one cache data-unit 625a-625e would be allocated from the free cache pool list 810.

Figure 8:
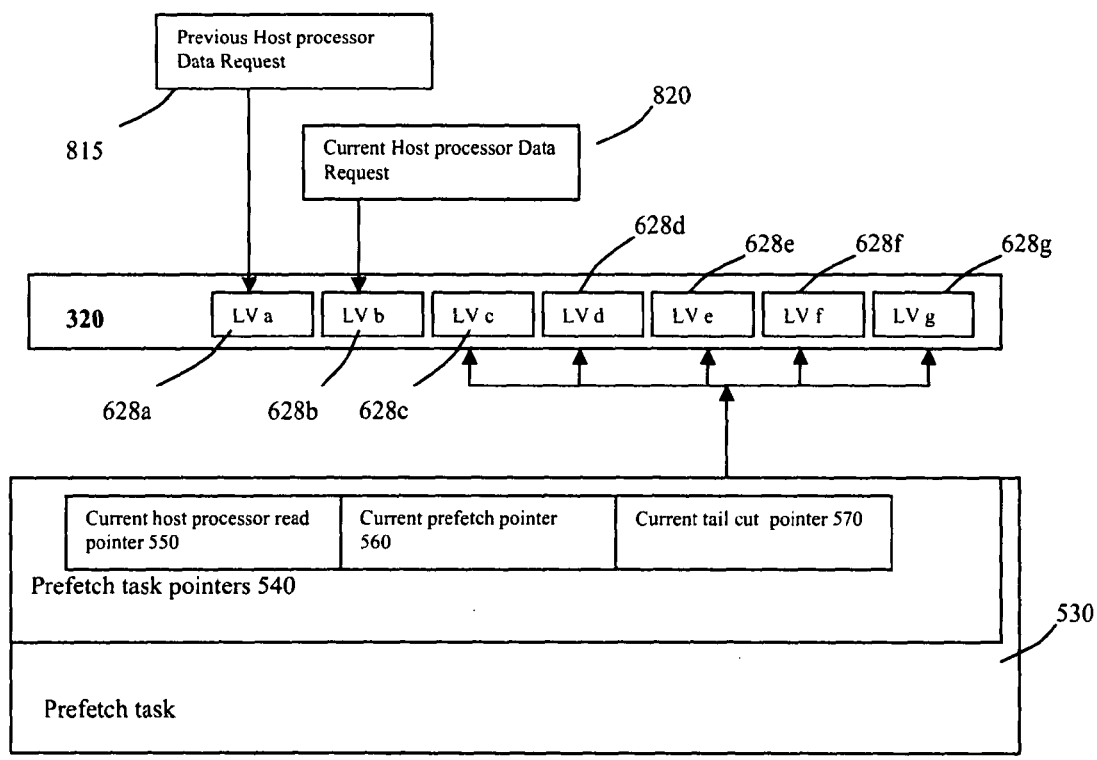
FIG. 8 is a block diagram of the prefetch task pointers.

FIG. 8 shows the prefetch task 530 keeping 3 prefetch task data read pointers 540, one pointer which keeps track of where the host processor 205, 210, 215 is reading 550, one pointer keeps track of where the data storage system is currently prefetching from the disk data storage device 560 and a third pointer showing the tail cut position 570. As disclosed in U.S. Pat. No. 7,143,393 entitled Method For Cache Management For Positioning Cache Slot, Ezra, et al., previous implementation only keeps 2 pointers, a pointer which keeps track of where the host processor 205, 210, 215 is reading, and a pointer keeps track of where the data storage system is currently prefetching from the disk data storage device 350. FIG. 8 shows the use and functionality of a prefetch task using and keeping 3 pointers. Whereas the prior art used two pointers, the addition of a third tail cut pointer 570 is an aspect of this invention. The addition of a third tail cut pointer allows the identification of the oldest data-units associated with a data stream's prefetch task. If cache data is found to be available for deallocation, the pointer associated with the oldest data-units associated with a data stream's prefetch task is set to the next oldest data-units associated with a data streams prefetch task. This allows for the removal of cache data on an incremental basis, and does require that the cache data be deallocated on the bases of an entire old cache stream, thereby reducing the Cache Pollution problem.

In FIG. 8, the host processor having previously requested 815 logical volume LV a, which has been transferred to cache memory and stored in Data-set 628*a* and the host processor is currently requesting 830 to read data from logical volume LV b, which is then stored in Cache memory Data-set 628*b*. The cache memory controller 22 has identified this as a sequential stream and has initiated a prefetch task 530. The prefetch task initiates off-cache read requests for LV c-LV g to be stored in Cache Data-sets 628*c*-628*g* respectively. The prefetch task 530 identifies where the host processor is currently reading and stores a pointer to that Data-set in prefetch task pointer field 550. The prefetch task also tracks which of the prefetch off-cache read requests 628*c*-628*g* are currently being prefetched into cache memory and stores a pointer to the prefetch task initiated prefetch Data-set in prefetch tasks pointer 560. The oldest currently active Data-set associated with a prefetch task is stored in prefetch task pointer 570 which is a pointer to the current tail cut position. In FIG. 8, the pointer to the current tail cut position 570 would be set to a pointer to Data-set 625*a*, the host request which has been identified as the first Data-set in the sequential stream which initiated prefetch task 530. Once LV a 628*a* has been read by the host processor, then the Cache memory location for LV a 628*a* could be "Cut" or freed so it can be made available for other uses. The prefetch task uses the pointer to the Data-set 570 and encodes the information that that LV a has been read in the TBC field 614 by setting the TBC field 614 to zero, and then adds that cache memory location into the free cache pool list 810.

Figure 9:
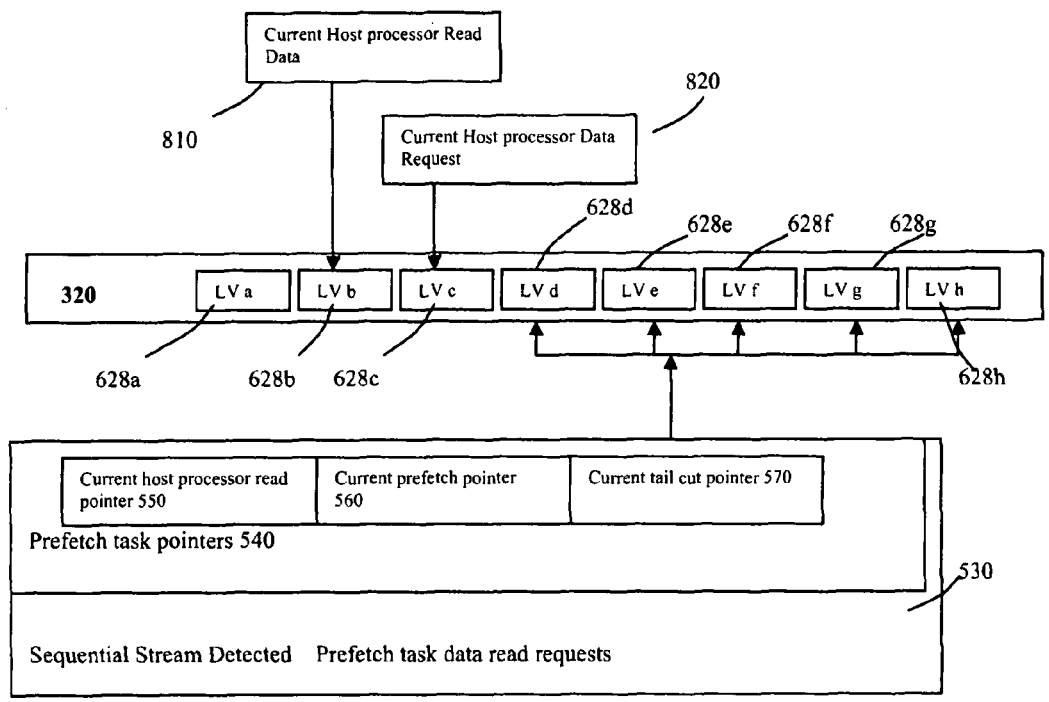
FIG. 9 is a block diagram of the prefetch task pointers.

FIG. 9 shows the host processor having completed the read of Data-set LV a 625*a* and is currently reading the cached Data-set for logical volume LV b 625*b*. Here the prefetch task 530 has already prefetched the data for logical volumes LV c-LV g. These volumes are stored in Cache Data-sets 628*c*-628*g* respectively. Once the tail cut for previously read Data-set 625*a* occurs, the prefetch task 530 then issues then next prefetch read request for in the sequential stream, logical volume LV h, while causing the allocation of cache memory for Data-set 625*h*. The current prefetch task pointer 560 is then set to point to Data-set 625*h*. The tail cut prefetch task pointer 570 is now set to Data-set LV b 625*b*. The current host processor read task pointer 550 is set to point to Data-set LV c 625*c*.

Under the prior art method, tail cutting is controlled and performed by the prefetch process. Essentially in this prior art method, the Cache Data storage area is dedicated to the Data-set associated with a sequential data stream are organized into a circular buffer. This circular buffer is allocated when a sequential data stream has been detected and a prefetch task is created. When new data is prefetched, it is written into the next available location in the circular buffer. If there is not enough space in the circular stream prefetch buffer, the prefetch task performs a tail cut operation. A read request is issued to the disk data storage device with the requested data being stored in location in the circular stream prefetch buffer containing the oldest data. Cache pollution is only resolved when it has been determined that the Sequential Data stream is no longer needed because the cache associated with that stream has not been accessed within a given time period. At that point all of the cache memory space allocated for the sequential stream cache memory task is freed up at once.

Figure 10:
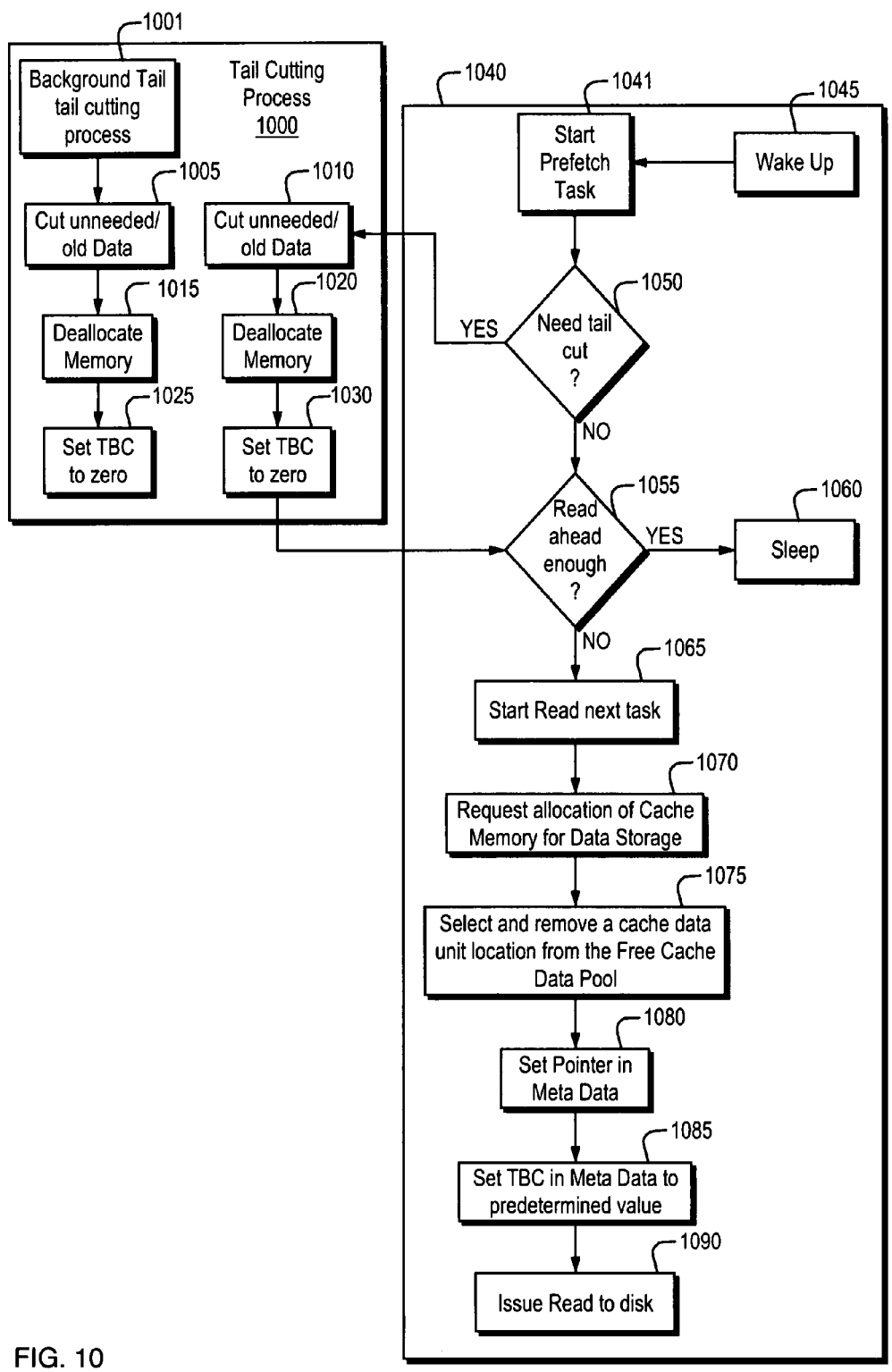
FIG. 10 is a flow chart for prefetch polling operation.

FIG. 10 describes the embodiment of the present invention method for a prefetch polling operation. Under this tail cutting method, the tail cutting process 1000 is a separate function which can run independent of the prefetch task. In the preferred implementation a background tail cutting process task step 1001 periodically reviews all the meta-data in the cache meta-data table 412 for old or host processor read data. Old data-units 625 whose TBC field 614 has reached a predetermined aging value or data that has been read by a host processor is tail cut in step 1005. The process then proceeds to step 1015, where the cache memory used by the tail cut data is then deallocated and added to the free cache pool list 810. Next in step 1025 the meta-data TBC 614 field associated with the deallocated cache data is set to zero.

FIG. 10 also shows that the tail cutting process can also be initiated by the prefetch task 1040. In Step 1041*a* prefetch task is started. As shown in step 1050, the prefetch task checks to see if the current prefetch task needs to be tail cut. If tail cutting is necessary, the prefetch task initiates a tail cut process by proceeding to step 1010. In step 1010, the tail cut process reviews the meta-data in the cache meta-data table 412 (FIG. 5) for old or host processor read data and tail cuts any old or host processor read data. The process then proceeds to step 1020 where the cache memory used by the tail cut data is deallocated and added to the free cache pool list 810 as shown in FIG. 2. In step 1030, the meta-data TBC field 614 (FIG. 4.) associated with the deallocated cache data is set to zero and control is then returned to the prefetch task at step 1055.

If either no tail cutting was necessary in step 1050 of the prefetch task or the tail cutting process had completed 1030, the prefetch task then in step 1055 checks to see if enough logical volumes for a sequential data stream have already been prefetched. If the correct amount of data as been prefetched into cache memory, then the prefetch task for that data stream will go to sleep as shown in step 1060. Under some predefined set of events, the sleeping prefetch task can later wake up as shown in step 1045. In step 1045, the wake up event starts its prefetch task process again by initialing step 1041.

If in step 1055 the prefetch task then determines that additional logical volumes in a sequential data stream need to be prefetched, a read request is generated for the next logical volume 380 in the sequential stream. In step 1070, the prefetch task then requests allocation of data-unit space in cache memory. Proceeding to step 1075, data-unit space in cache memory is allocated by selecting and removing a location from the free cache pool list 810. Once a data-unit location has been allocated for the next sequential data read, step 1080 shows that the location of the newly allocated data-unit location is written to the cache_track_pointer location 414 (FIG. 3) for the Data-set 628 shown in FIG. 5. The prefetch task in step 1085 then sets the TBC field 614 (FIG. 4) for the Data-set 628 (FIG. 5) to a predetermined value, allowing step 1090 to issue an off-cache read request to the disk data storage device 350.

Figure 11:
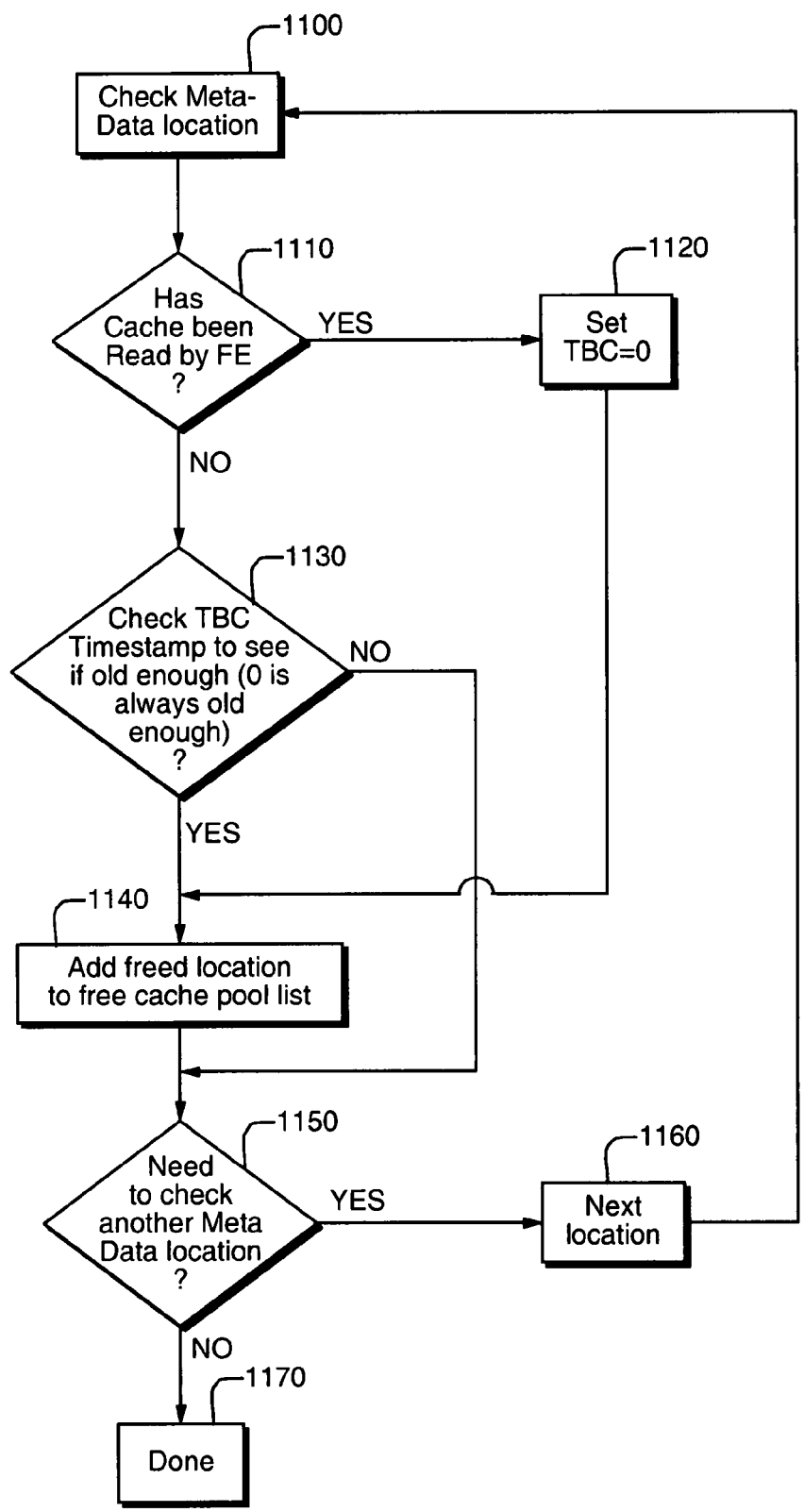
FIG. 11 is a flowchart for a tail cutting process.

FIG. 11 shows a flowchart of the preferred implementation for the tail cutting process. Although this is the preferred method, other methods are possible. In step 1100, the tail cut process first reads the meta-data location 622 (FIG. 5) associated with the Data-set 628 for a selected Logical volume from the meta-data table 412 (FIG. 5). The READ flag 620 (FIG. 4) of the id_flag 413 field (FIG. 3) is checked to see if the Data-set 628 (FIG. 5) has already been read by the host processor in step 1110. If the Data-set 628 has already been read, the process proceeds to step 1120 in which the TBC field 614 (FIG. 4) for that Data-set is set to zero and the process then proceeds to step 1140. If the Data-set 628 (FIG. 5.) has not been previously read, the tail cut process checks to see if the TBC field 614 (FIG. 4) is currently set to zero in step 1130. In our preferred implementation 0 is the value encoded into the TCB field to signify that a Data-set as already been read by the host processor and thus available for deallocation and does not contain a valid data-unit, however other encoding schemes are possible.

If the TBC field 614 is set to zero, then the current data-unit 625 (FIG. 5.) location pointed to by the cache_track_pointer 414 is then added to the free cache pool list 810 (FIG. 2) in step 1140 which frees the cache-slot data-unit for reuse. The tail cutting process proceeds to step 1150 where the process checks to see if other meta-data locations need to be checked for tail cutting, if so the next location in the meta-data table 412 (FIG. 3) is selected in step 1160, and the process starts again. If no other meta-data locations need to be checked then the tail cutting process is completed (step 1170). Under this method, cache data is freed up on a block by block basis and not only on a Sequential Stream prefetch task basis. This method also frees up any old data not directly associated with a running prefetch task.

CONCLUSION

Using the prefetch management processes and systems of the present invention described herein, a computer system may use tail cutting while prefetching, even when the data-units that are being prefetched are required for a read request before a prefetch operation is completed or even issued. Providing a prefetch management system of the present invention allows the computer system to limit the pollution of cache memory by sequential read data, to decrease the number of data-units treated as Read Miss Operations, and to reduce the overall number of orphan prefetches in a cache memory while maximizing the effectiveness of the prefetch operations that are issued. Additionally the new algorithm effectively frees cache memory in the case of a Long MISS Operation where data blocks/slots in the sequence were in cache before they were subject to a sequential prefetch task.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for prefetching data-units into a cache memory in response to data read requests from at least one host processor, the cache memory being coupled to the at least one host processor and to at least one off-cache data storage device, the method comprising:

executing a first prefetch task to prefetch a first prefetch series of data-units from the off-cache data storage device's logical locations for storage in the cache memory, the first prefetch task comprising:
  initiating a first prefetch operation to prefetch a first selected set of data-units; and
  storing the data-units in a data-set in the cache memory, the data-set comprising:
    the data-units prefetched in accordance with the first prefetch task; and
    meta-data associated with the data-units, wherein the cache memory includes a data area that stores the data-units and a meta-data area that stores the meta-data, and wherein the meta-data includes meta-data information indicating whether the data-units have been prefetched into the cache memory and meta-data information indicating a status of the data-units in the cache memory, wherein the meta-data includes a timestamp field that includes timestamp information and information indicating whether or not the data-unit in the data-set contains valid data, wherein the information indicating whether or not the data-unit contains valid data is encoded in the timestamp information;

making decisions about the first prefetch task, subsequent prefetch operations and prefetch tasks based on read requests, the data-units requested by the read requests, the data-units that are stored in the cache memory and that are associated with the first prefetch task, and the meta-data associated with the data-units;

determining whether or not an additional data-unit that is read from an off-cache logical location is a first prefetch series member comprising a data-unit in the first prefetch series;

upon determination that the additional data-unit is a first prefetch series member, associating the additional data-unit with the first prefetch task, wherein making decisions further comprises treating the additional data-unit as having been prefetched into cache memory in accordance with the first prefetch task upon associating the additional data-unit with the first prefetch task; and performing a tail cutting process, the tail cutting process including:
  reviewing the meta-data of a particular data-unit in the cache memory;
  selecting the particular data-unit for deallocation based on a deallocation selection criteria, wherein the deallocation selection criteria includes the meta-data of the particular data-unit indicating that the particular data-unit has been prefetched into the cache memory and that the particular data-unit is not valid; and
  deallocating memory space of the particular data-unit in the cache memory if the particular data-unit is selected for deallocation.

2. The method in claim 1 further comprises:

tracking available unused data-unit space in the cache memory;

allocating unused data-unit space in the cache memory; and storing the prefetched data-units at an allocated cache memory space.

3. The method in claim 2 wherein the meta-data further comprises the address of cache memory space allocated for the data-unit storage.

4. The method in claim 1 further comprising:
storing information in the meta-data associated with a read data-unit indicating that the data-set does not contain valid data if the read data-unit does not contain valid data.

5. The method in claim 4 wherein deallocating data-unit space in the cache memory further comprises:
adding the address of the deallocated data-unit space to a free cache pool list.

6. The method in claim 4 wherein deallocation selection criteria comprises meta-data indicating a previously read data-unit.

7. The method in claim 4 wherein deallocation selection criteria comprises meta-data of a selected timestamp value.

8. The method in claim 4 wherein the first prefetch task further comprises:
tracking the address of the logical location at which the host processor is currently reading; and
tracking the address of the logical location of the prefetched data-unit address of the prefetch task, wherein the address of the logical location of the oldest data-set associated with the prefetch task is tracked.

9. The method in claim 8 further comprising removing a data-set's association as a prefetch series member upon the determination of a data-unit being deallocated.

10. The method in claim 9 further comprising:
removing the logical location associated with the data-set removed as a prefetch series member from the tracking address of the oldest data-set associated with the first prefetch task, and
updating the first prefetch task tracking address of the logical location of the oldest data-set currently associated with the first prefetch task.

11. A cache management method for reducing cache pollution of cache memory, the method comprising:
reviewing a data-set in the cache memory, the data-set comprising;
a data-unit conforming to data stored in a logical location of an off-cache data storage device; and
meta-data associated with the data-unit, wherein the cache memory includes a data area that stores the data-unit and a meta-data area that stores the meta-data, and wherein the meta-data includes meta-data information indicating whether the data-unit has been prefetched into the cache memory and meta-data information indicating a status of the data-unit in the cache memory; and
performing a tail cutting process, the tail cutting process including:
deciding, using the meta-data, that cache memory space of the data-unit conforms to a deallocation criteria if the meta-data of the data-unit indicates that the data-unit has been prefetched into the cache memory and that the data-unit is not valid; and
deallocating memory space of the data-unit in the cache memory.

12. The method in claim 11, wherein the deallocation criteria comprises:
determining if a timestamp value conforms to a selected timestamp value.

13. The method in claim 11, wherein the deallocation criteria comprises:
reviewing data read information in the meta-data; and
determining that the data-set has been read by a host processor.

14. The method in claim 12, further comprises:
encoding the timestamp value in the meta-data to indicate that the data-unit is to be deallocated.

15. The method in claim 11, further comprising:
maintaining a free cache pool list;
adding the location of the deallocated the data-unit cache memory space to the free cache pool list.

16. A data storage system adapted to monitor and respond to host processor data read requests for data stored at a logical location in the data storage system, the data storage system comprising:
a cache memory;
an off-cache memory; and
a data storage controller connected to the cache memory and the off-cache memory to run a prefetch management system, the prefetch management system adapted to prefetch data from the off-cache memory, monitor data read requests from a host processor and to transfer data to the cache memory;
the prefetch management system comprising:
a prefetch task executor adapted to initiating a first prefetch task to prefetch a first series of data-units from off-cache memory logical locations in the off-cache memory storage in the cache memory;
the prefetch task executor comprising:
a prefetch operation initiator adapted to initiating a first prefetch operation to prefetch the first prefetch series of data-units, and
a cache storing unit adapted to storing data-units in a data-set in the cache memory in accordance with the first prefetch task, the data-set comprising:
the data-units prefetched; and
meta-data associated with the data-units, wherein the cache memory includes a data area that stores the data-units and a meta-data area that stores the meta-data, and wherein the meta-data includes meta-data information indicating whether the data-unit has been prefetched into the cache memory and meta-data information indicating a status of the data-unit in the cache memory;
wherein, the cache storing unit is further adapted to store timestamp information and information whether the data-set contains valid data-unit data by encoding the valid data-unit information in the timestamp information stored in the associated meta-data portion of the data-set;
a prefetch decision unit adapted to make decisions about the first prefetch task, the first prefetch operation and subsequent prefetch operations and subsequent prefetch tasks based on read requests, the data requested by the host processor data read requests, data-units that are stored in the cache memory and that are associated with the first prefetch task, and the meta-data associated with the data-units;
a prefetch set member identifier adapted to determine whether an additional data-unit read from the off-cache memory logical location is a first prefetch series member comprising a data-unit in the first prefetch series of data-units;
a prefetch task association unit adapted to associate the additional data-unit as a first prefetch series member;
wherein the prefetch decision unit is further adapted to make decisions to treat the additional data-unit as having been prefetched into cache memory in accordance with the first prefetch task upon the associating of the additional data-unit with the first prefetch task;

the cache memory adapted to respond to the host processor data read request by retrieving the requested data from the cache memory if the requested data is available in the cache memory and the cache memory is further adapted to respond to data write requests by the prefetch management system; and the off-cache memory adapted to respond to the host processor data read request by retrieving the requested data from off-cache memory logical locations if the data is not available in the cache memory and the off-cache memory is further adapted to respond to the data read requests by the prefetch management system, and wherein the data storage controller performs a tail cutting process, the tail cutting process including:

reviewing the meta-data of a particular data-unit in the cache memory;

selecting the particular data-unit for deallocation if the meta-data of the particular data-unit indicates that the particular data-unit has been prefetched into the cache memory and that the particular data-unit is not valid; and deallocating memory space of the particular data-unit in the cache memory if the particular data-unit is selected for deallocation.

17. The system in claim 16 wherein the prefetch task executor is further adapted to track the address of the logical location at which the host processor is currently reading, track the address of the logical location at which the first prefetch task is prefetching data-units and track the address of the logical location of the oldest data-set associated with the first prefetch task.

18. A non-transitory computer readable medium storing computer software for cache management to reduce cache pollution of cache memory, the computer software comprising:

executable code that reviews a data-set in the cache memory, the data-set comprising;

a data-unit conforming to data stored in a logical location of an off-cache data storage device; and meta-data associated with the data-unit, wherein the cache memory includes a data area that stores the data-unit and a meta-data area that stores the meta-data, and wherein the meta-data includes meta-data information indicating whether the data-unit has been prefetched into the cache memory and meta-data information indicating a status of the data-unit in the cache memory;

executable code that decides, using the meta-data information indicating the status of the data-unit, that cache memory space of the data-unit conforms to a deallocation criteria;

executable code that deallocates the cache memory space of the data-unit; and executable code that performs a tail cutting process, the tail cutting process including:

reviewing the meta-data of a particular data-unit in the cache memory;

selecting the particular data-unit for deallocation if the meta-data of the particular data-unit indicates that the particular data-unit has been prefetched into the cache memory and that the particular data-unit is not valid; and deallocating memory space of the particular data-unit in the cache memory if the particular data-unit is selected for deallocation.

19. The non-transitory computer readable medium of claim 18, wherein the deallocation criteria comprises:

determining if a timestamp value conforms to a selected timestamp value.

20. The non-transitory computer readable medium of claim 18, wherein the deallocation criteria comprises:

reviewing data read information in the meta-data; and determining that the data-set has been read by a host processor.

* * * * *